B. J. CARTER.
NUT LOCK.
APPLICATION FILED MAY 24, 1912.
1,068,981. Patented July 29, 1913.
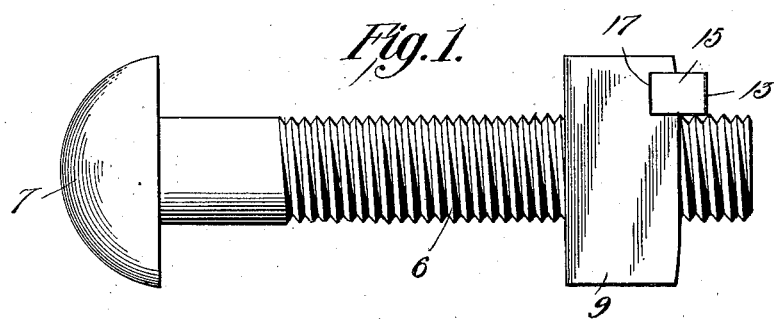
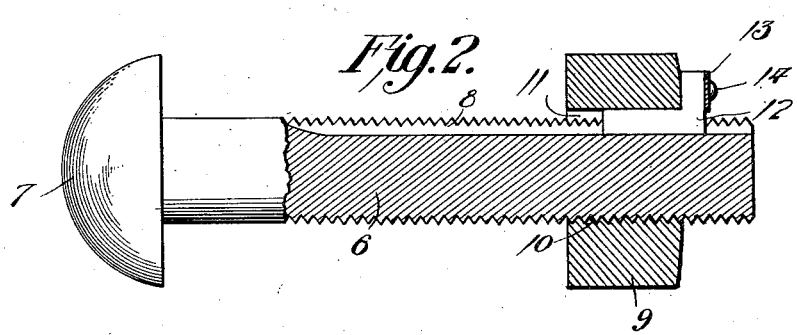
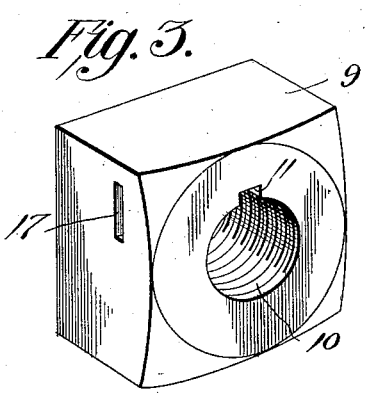
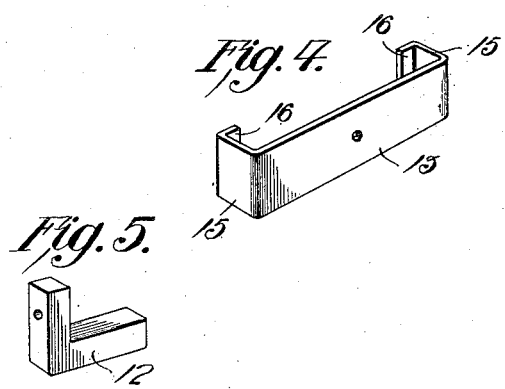
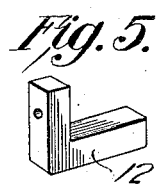
Inventor
Brauch J. Carter,
Witnesses
By Victor J. Evans
Attorney

UNITED STATES PATENT OFFICE.

BRANCH JOSEPH CARTER, OF EAST SIDE SAGINAW, MICHIGAN.

NUT-LOCK.

1,068,981. Specification of Letters Patent. Patented July 29, 1913.

Application filed May 24, 1912. Serial No. 699,425.

*To all whom it may concern:*

Be it known that I, BRANCH J. CARTER, a citizen of the United States, residing at East Side Saginaw, in the county of Saginaw and State of Michigan, have invented new and useful Improvements in Nut-Locks, of which the following is a specification.

The general object of this invention is to provide a locking device which is adapted to be applied to a nut and bolt to securely maintain said nut in locking engagement with the bolt and prevent the same from working loose by reason of the jar to which said bolt is subjected when used in connection with railroad rails.

In carrying out the objects of the invention generally stated above, it will be understood, of course, that the essential features thereof are susceptible to changes in details and structural arrangements, one preferred and practical embodiment being shown in the accompanying drawing, wherein:—

Figure 1 is a side elevation of the nut and bolt constructed in accordance with the invention. Fig. 2 is a vertical sectional view therethrough. Fig. 3 is a perspective view of the nut used in connection with the invention. Fig. 4 is a perspective view of the locking plate used in connection with the invention. Fig. 5 is a perspective view of a locking key.

Referring more particularly to the accompanying drawing it will be seen that the invention comprises a bolt 6 having a head 7, said bolt being provided at its periphery with a longitudinal groove 8 which extends the major portion of the length of said bolt.

The nut 9 used in connection with this invention is provided with a central threaded opening 10 adapted to receive the bolt 6, said opening being recessed at 11 to provide a groove which extends throughout the thickness of said nut. When the nut is in position upon the bolt the groove 11 thereof and the groove 8 of the bolt are adapted to receive one arm of a substantially L-shaped locking key 12, the other arm of which abuts against the outer face of the nut 9, thereby preventing further turning of said nut upon the bolt.

The locking key 12 is held in its locking position by a locking plate 13 which is adapted to engage the arm of the locking key 12 which abuts against the outer face of the nut and which is secured thereto by means of a rivet 14. The locking plate 13 extends transversely of the key 12 so as to overlie the outer face of the nut and is provided at its extremities with laterally extending wings 15 which engage adjacent sides of the nut 9 at their extremities with inturned flanges 16 adapted to engage longitudinal grooves 17 formed in the sides of said nut. It will be understood of course that the locking plate 13 is made of suitable metal having sufficient flexibility in order to be readily applied to the nut.

From the foregoing description it will be obvious that the invention contemplates providing a nut lock which is simple in construction, durable, and effective in carrying out the purpose for which it is designed.

What is claimed is:—

A nut lock comprising a bolt having longitudinally extending groove therein, a nut formed with a bolt opening and a groove contiguous to said opening, two of the opposing sides of the nut being formed with recesses, a substantially L-shaped key having a long arm and a short arm, the long arm fitting and coöperating with both the groove in the bolt and the groove in the nut, the short arm having a length less than the minimum radial length of the nut beyond the bolt opening and overlying and bearing throughout its length against the face of said nut, and a locking plate secured to the short arm of the key and having inturned terminals to coöperate with the recesses in the sides of the nut, whereby the locking plate is spaced throughout its length from the face of the nut beyond the groove.

In testimony whereof I affix my signature in presence of two witnesses.

BRANCH JOSEPH CARTER.

Witnesses:
JACOB N. FROST,
WILLIAM AGARE.

Copies of this patent may be obtained for five cents each, by addressing the "Commissioner of Patents, Washington, D. C."